No. 881,228. PATENTED MAR. 10, 1908.
J. A. DYBLIE.
COCK FOR CONTROLLING FLUID UNDER PRESSURE.
APPLICATION FILED MAY 27, 1903.
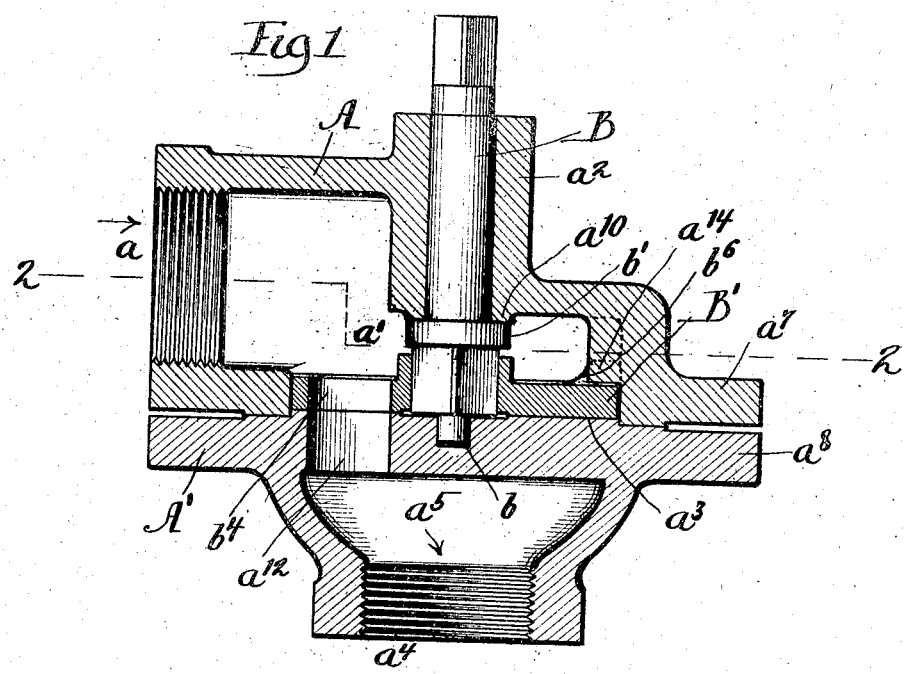
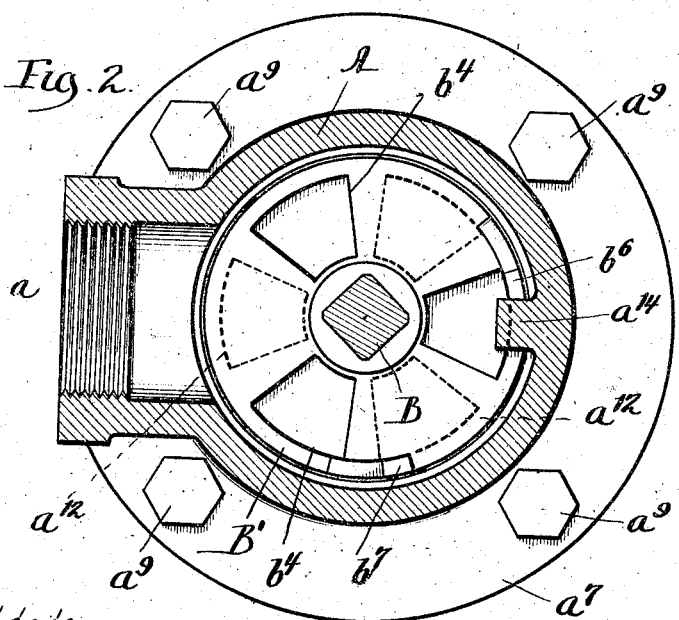
Witnesses:
Fred Gerlach
Alberta Adamick
Lillian Prentice
Inventor:
Julius A. Dyblie
By Price & Fisher
his Attorneys

UNITED STATES PATENT OFFICE.

JULIUS A. DYBLIE, OF JOLIET, ILLINOIS, ASSIGNOR OF ONE-HALF TO HOLLIS R. McCULLOUGH, OF CHICAGO, ILLINOIS.

COCK FOR CONTROLLING FLUID UNDER PRESSURE.

No. 881,228.     Specification of Letters Patent.     Patented March 10, 1908.

Application filed May 27, 1903. Serial No. 158,906.

*To all whom it may concern:*

Be it known that I, JULIUS A. DYBLIE, a citizen of the United States, residing at Joliet, in the State of Illinois, have invented certain new and useful Improvements in Cocks for Controlling Fluid Under Pressure, of which I do declare the following to be a full, clear, and exact description, reference being had to the accompanying drawing, forming part of this specification.

The present invention has more particularly for its object to provide an improved construction of blow-off cock for boilers, although the invention will be found applicable to cocks designed for other purposes.

The object of the invention is to provide a simple, effective and durable construction of cock whereby the danger of leakage shall be prevented and to this end the invention consists in the features of improvement hereinafter described, illustrated in the accompanying drawing and particularly pointed out in the claims at the end of this specification.

Figure 1 is a view in central, vertical section through a blow-off cock embodying my invention. Fig. 2 is a view in horizontal section on line 2—2 of Fig. 1, parts being shown in plan view.

In the embodiment of my invention illustrated in the accompanying drawing, the casing is formed of two sections A and A', these sections being preferably formed of cast metal. The section A is provided with an inlet port $a$ communicating with the chamber $a'$ and this port is suitably threaded or flanged for connection to a pipe that will unite the cock to the boiler and the casing A is formed with an elongated boss $a^2$ having an opening therein to receive the valve-stem B.

The section A' of the casing is formed with a valve-seat $a^3$ and with a discharge port $a^4$ that leads from the chamber $a^5$ on the exhaust side of the valve-seat.

The sections A and A' are provided with peripheral flanges $a^7$ and $a^8$ that will be bolted together as at $a^9$ and preferably the valve-seat $a^3$ is raised above the flange $a^9$ of the casing section A' and sets within the chamber $a'$ of the casing section A. Within the chamber $a'$ of the casing section A and upon the pressure side of the valve-seat $a^3$ is mounted the rotary disk-valve B', and as shown this valve is provided with a polygonal opening to receive the correspondingly shaped lower end of the valve-stem B that loosely sets within the opening of the valve. The valve-seat $a^3$ is provided with a central socket to receive the reduced lower end $b$ of the valve-stem that freely turns within the socket.

Upon the valve-stem B is the collar $b'$ adapted to bear against an offset seat $a^{10}$ that encircles the valve-stem at the inner end of the opening through which the valve-stem passes, and the upper end of the valve-stem B is preferably squared to receive a suitable handle (not shown) whereby the valve will be manipulated.

Preferably the valve B' is formed with a plurality of openings $b^4$ and corresponding openings $a^{12}$ are formed in the valve-seat $a^3$. When the openings of the valve and its seat correspond fluid will pass freely through the casing, but when the valve is turned so that its openings are blanked by the seat $a^3$ the passage of fluid through the casing will be cut off.

By reference more particularly to Fig. 2 of the drawings it will be seen that the valve B' is provided with lugs or raised portions $b^6$ and $b^7$ adjacent the edge of the valve, these raised portions being adapted to contact with a projection or stop $a^{14}$ that overhangs the valve B' between the lugs or raised portions $b^6$ and $b^7$, and these lugs $b^6$ and $b^7$ and the stop $a^{14}$ serve to determine the full open and closed positions of the valve.

Inasmuch as the rotary valve B' is mounted upon the pressure side of the valve-seat $a^3$, the pressure of the liquid within the chamber $a'$ will serve to normally hold the valve to its seat so that danger of leakage at such point is avoided and the accumulation of dirt, scale or the like between the valve and its seat is thus effectively guarded against. So also it will be seen that as the wear of the valve occurs it will maintain a true bearing against its seat. Inasmuch as the valve-stem B is loosely connected to the valve B', the collar $b'$ being at a slight distance from the valve the pressure of fluid within the casing will serve at all times to cause the collar to bear against its seat and thus guard against danger of leakage around the valve-stem. This provision of a collar on the valve-stem for preventing the leakage of fluid around the stem, is an important feature because it avoids the necessity for the packing of the stem and thus materially contributes to the cheapness and efficiency of the cock.

From the foregoing description it will be seen that when the valve B' is in the position seen in Fig. 1 of the drawings, fluid may pass freely through the casing but when the valve is turned to closed position the passage of fluid through the casing will be cut off, and the lugs $b^6$ and $b^7$ and stop $a^{14}$ enable the valve to be positively stopped in either the full open or completely closed position.

While I have described what I regard as the preferred form of my invention, I wish it distinctly understood that the invention is not limited to the precise details of construction above set out since these may be varied by the skilled mechanic, and features of the invention may be employed without its adoption as an entirety.

Having described my invention what I claim as new and desire to secure by Letters Patent is:

1. A cock for controlling the flow of fluid under pressure, comprising a casing consisting of two chambered sections bolted together, one of said sections being supplied with an admission port and a valve stem opening having a seat at its inner end and the other of said sections being provided with a discharge port and with a raised valve seat extending within the first mentioned section, a rotary disk valve mounted upon the pressure side of said valve seat and having a central polygonal opening and a valve stem having a corresponding polygonal lower portion setting loosely within the central opening of said valve and interlocking therewith to effect its rotary movement, said stem being free to move at right angles to the plane of the valve and having a collar adapted to bear against the seat at the inner end of the stem opening, the lower end of said valve stem being provided with a reduced portion journaled within a suitable socket in said valve seat, substantially as described.

2. A cock for controlling the flow of liquid under pressure comprising a casing formed of two chambered sections having integral flanges bolted together, one of said sections having an outlet and an integral valve seat thereon raised above the meeting line of said sections and extending within the chamber of the other of said sections, a rotary disk valve on the pressure side of said valve seat having a central polygonal opening, said second casing section having an inlet port and an integral sleeve bored to form a stem opening and provided with a raised seat at its inner end, and a valve stem extending through said sleeve and having an integral collar engaging the seat at the inner end thereof and a polygonal lower portion set loosely within the central opening of said valve, said valve and stem being freely removable one from the other and held in opposite directions to the respective seats solely by the pressure within the valve casing, substantially as described.

JULIUS A. DYBLIE.

Witnesses:
GEORGE P. FISHER, Jr.,
ALBERTA ADAMICK.